US008717592B2

(12) United States Patent
De Boer et al.

(10) Patent No.: US 8,717,592 B2
(45) Date of Patent: May 6, 2014

(54) METHOD FOR PROCESSING DOCUMENTS ON AN IMAGE-PROCESSING APPARATUS

(75) Inventors: Taco M. De Boer, Sambeek (NL); Nanne Krikke, Nijmegen (NL)

(73) Assignee: OCE-Technologies B.V., Venlo (NL)

( * ) Notice: Subject to any disclaimer, the term of this patent is extended or adjusted under 35 U.S.C. 154(b) by 0 days.

(21) Appl. No.: 13/310,402

(22) Filed: Dec. 2, 2011

(65) Prior Publication Data
US 2012/0069384 A1 Mar. 22, 2012

Related U.S. Application Data

(63) Continuation of application No. PCT/EP2010/056963, filed on May 20, 2010.

(30) Foreign Application Priority Data

Jun. 4, 2009 (EP) ..................................... 09161899

(51) Int. Cl.
*G06K 15/02* (2006.01)
(52) U.S. Cl.
USPC .......... 358/1.14; 358/1.13; 358/1.1; 358/296; 358/1.12; 347/19; 400/74
(58) Field of Classification Search
USPC .............. 358/296, 1.1, 1.14; 400/74; 709/206
See application file for complete search history.

(56) References Cited

U.S. PATENT DOCUMENTS

| | | | | |
|---|---|---|---|---|
| 5,055,935 A * | 10/1991 | Ohno | ............................ | 358/296 |
| 5,620,264 A * | 4/1997 | Kagita | ............................ | 400/74 |
| 5,625,757 A * | 4/1997 | Kageyama et al. | .......... | 358/1.14 |
| 5,911,527 A * | 6/1999 | Aruga et al. | .................. | 400/149 |
| 6,624,903 B1 * | 9/2003 | Miquel et al. | ................. | 358/1.12 |
| 6,681,245 B1 * | 1/2004 | Sasagawa | ...................... | 709/206 |
| 7,190,481 B2 * | 3/2007 | Hirabayashi | ................. | 358/1.18 |
| 7,283,269 B2 * | 10/2007 | Tanimoto | ...................... | 358/1.15 |
| 2003/0112452 A1 * | 6/2003 | McIntyre | ....................... | 358/1.1 |
| 2003/0123100 A1 * | 7/2003 | Tanimoto | ...................... | 358/402 |
| 2005/0089168 A1 * | 4/2005 | Kahre | ........................... | 380/211 |

* cited by examiner

*Primary Examiner* — Ashish K Thomas
(74) *Attorney, Agent, or Firm* — Birch, Stewart, Kolasch & Birch, LLP

(57) ABSTRACT

A method for processing print jobs by an image-processing apparatus includes an output module for receiving output of the print jobs and a control unit configured to maintain a queue of print jobs to be processed. The method includes, for each print job, the steps of printing the print job by the image-processing apparatus, and stacking output of the print job in the output module. The control unit is configured to maintain an output check list and the method further includes the step of, when a recoverable error occurs during processing of the print job, that does not lead to an automatic stop of the processing but is likely to cause faulted pages in the printed output, automatically creating an entry in the output check list, so as to advise an operator to check the possibly faulted pages in the output stack.

14 Claims, 7 Drawing Sheets

METHOD FOR PROCESSING DOCUMENTS ON AN IMAGE-PROCESSING APPARATUS

CROSS-REFERENCE TO RELATED APPLICATIONS

This application is a Continuation of International Application No. PCT/EP2010/056963, filed on May 20, 2010, and for which priority is claimed under 35 U.S.C. §120, and which claims priority under 35 U.S.C. §119 to Application No. 09161899.1, filed on Jun. 4, 2009. The entirety of each of the above-identified applications is expressly incorporated herein by reference.

BACKGROUND OF THE INVENTION

1. Field of the Invention

The present invention relates to a method for processing print jobs by an image-processing apparatus comprising an output module for receiving an output of the print jobs and a control unit configured to maintain a queue of print jobs to be processed. The method comprises for each print job the steps of printing the print job by the image-processing apparatus and stacking the output of the print job in the output module.

2. Background of the Invention

A method for processing print jobs on a printer has, for example, been disclosed by U.S. Pat. No. 6,681,245. The method disclosed in this patent is suitable for printing documents from a user workstation and comprises detecting of normal and special events which are related to the printer, a printer server, a job or a user operation. These events are presented in a log file. The method is directed to printing of jobs with user interaction. Since all kind of events are registered, the log file becomes large. Since the log file is usually ordered by time of occurrence of the event, the entries of a certain kind of event are scattered among the entries of the log file. If the event is not related to a print job, it becomes difficult to trace the print job corresponding to the event. Therefore the log file is not suited to get a quick overview of a certain kind of event or to trace a faulty print job.

When printing documents on an image-processing apparatus, a print error may occur. For example, a document may be printed erroneously. Also, the image-processing apparatus may stop due to the error and the user will, for example, find a faulty document in the output module of the image-processing apparatus. This finding may be easy since this faulty document is the last document printed by the image-processing apparatus.

However, a document may be printed erroneously and not lead to a stop of the image-processing apparatus. A print error of this kind may lead to a fault in the output of the document, and even to no output at all. When the image-processing apparatus has continued printing jobs from the queue after such a faulty job, such an error is called a machine recoverable error or a non-fatal error. Such a faulty job may have several causes, e.g. a wrong page format of the source file of the document, extra pages due to error recovery actions of the image-processing apparatus, an out-of-range value of a sensor of the image-processing apparatus or an out-of-memory problem of the image-processing apparatus. Especially when printing many documents, without user intervention, a machine recoverable error may occur and may cause a job to be printed erroneously. However, the job is nevertheless received by the output module and completed. Jobs, subsequent to the faulty job, are printed such that the faulty output of the faulty job is in the output module among all the documents printed. In view of this, it can become difficult to locate the faulty output.

An error may occur, which can only be handled by operator intervention. Such an error is called an operator recoverable error. An example of an operator recoverable error is a paper jam in the image-processing apparatus. If such an error occurs, the operator has to open doors of the image-processing apparatus, remove paper and close the doors again, and so on. If the operator has not interfered with the documents in the output module, the print job which has caused the paper jam has been completed and the output of the print job has been stacked in the output module of the image-processing apparatus. However, the output of the print job may nevertheless contain a fault.

The processing of the jobs described in this application is directed to let the image-processing apparatus print jobs from the queue continuously. If a print job can not be completed or an abnormal end of the job has occurred in the case of a machine recoverable error or an operator recoverable error, the image-processing apparatus will not stop, but will go on with the next print job in the queue. Hereinafter, a machine recoverable error and an operator recoverable error are both referred to as a recoverable error.

It is noted that U.S. Patent Application Publication No. 2003/112452 discloses event log files created by an image-processing apparatus. Transmittal errors of the print job to the printer and converting errors making a print ready file corrupt are logged and result in a general error message at the apparatus and a stop of the processing of the apparatus. The job will not be executed and will generate no output. The event log also contains errors due to a printer function in the image-processing apparatus. Information not related to a print job, but to a printer function that is selected by a user, is tracked, such as the usage of a printer mechanical component like a collator or a stapler. From such an event log, the position of faulty pages in a stacked output due to a printer function error is not clear. Moreover, such an event log includes a great number of entries of different kinds, and it is difficult or at least time-consuming to extract information related to possible incorrectly printed sheets in an output stack.

An abnormal end of the job may be that the print job is not translated by the image-processing apparatus in an output that was expected by the user. Sometimes user files are corrupted or in a format that is not supported by the image-processing apparatus. The image-processing apparatus is then not able to process the input of the print job correctly, or problems are encountered during processing of the image data of the print job. This may result in a missing page of a document to be printed or may result in no output at all. In other words, all pages of the document are missing. In some situations an additional page may be printed. This may be the case, for example, if the image-processing apparatus is provided with an error recovery mechanism that detects a faulty page and triggers the image-processing apparatus to print an extra page behind the faulty page, which extra page does not contain the error of the faulty page.

A user sends a job or a plurality of jobs to the image-processing apparatus. The user may walk up to the image-processing apparatus and arrive at the image-processing apparatus after all jobs have been processed. The user may then look at the user interface and investigate the event logging, which has been generated by the image-processing apparatus. The user may conclude from the logging that during processing the plurality of print jobs some error has occurred, but the user cannot immediately determine which job is responsible for the error, which job has not been completed successfully and/or which job has been completed with an abnormal end. The faulty job output is often submerged into a stack of printed documents of a plurality of jobs. Sometimes the image-processing apparatus is provided with a separate output module for a faulty job, and then the user may check this separate output module for the faulty output. However, if the image-processing apparatus is not provided with such a separate output module, the faulty output may be difficult to find in the regular output module. This is especially the case when printing wide format documents, since most wide format printers are not provided with such a separate output module.

In most cases, for example, when printing is done unattended, the number of printed documents may be large, which results in a large pile of documents in the output module of the image-processing apparatus. For example in overnight printing without the possibility of any operator intervention, if the printing has not stopped, the operator will find a stack of printed documents in the morning. To reveal if a document has been printed incompletely or over-completely as described here-above, a glance at the stack of the documents is not sufficient. The operator has to look at the documents one by one or consult the log file, both ways of working being rather cumbersome.

SUMMARY OF THE INVENTION

The object of the present invention is to provide a method for processing documents on an image-processing apparatus in which the above-mentioned problem is solved.

This object is achieved by a method for processing print jobs with an image-processing apparatus comprising an output module configured to receive an output of the print jobs and a control unit configured to maintain a queue of print jobs to be processed, said method comprising for each print job the steps of: printing the print job with the image-processing apparatus; and stacking the output of the print job in the output module, wherein the control unit is configured to maintain an output check list and the method further comprises the step of: when a recoverable error occurs during processing of the print job, that does not lead to an automatic stop of the processing but is likely to cause faulted pages in the printed output, automatically creating an entry in the output check list, so as to advise an operator on the possibly of faulted pages in the output stack.

Each entry in the output check list is related to a print job. A print job may contain one or more documents to be printed by the image-processing apparatus. This coupling of the print job and an output check list entry makes it easy to determine a print job that has been completed abnormally. In the case of an abnormal end, a page of the print job may be missing or may be superfluous. In other words, the printed data does not match with the user's expectations. The image-processing apparatus may produce pages that were not expected by the user, for example as a result of recovery actions or end-of-roll situations. In an end-of-roll situation, it may occur that a scrap of paper, on which no complete image can be printed, is left over after a last complete image is printed. If a second roll takes over the printing of the images of the document that are still to be printed, the scrap of paper will be present in between the complete pages of the document.

If the unattended printing has resulted in a large pile of documents, it may contain incomplete or over-complete documents. This is not directly visible from the outside of the pile. The present solution enables the user to find the incomplete or over-complete documents from the pile by consulting the output check list. If there are no entries in the output check list, the user knows that there are no such jobs among the pile of documents.

Although cases in which the image-processing apparatus has printed a print job with a recoverable error are expected to be rare, these cases need to be handled in a way that causes the least discomfort for the user. Anticipation of these problems is done as early as possible, for example by preventing submitting of jobs that cannot be processed or printed by the image-processing apparatus. When a problem is anticipated, the user knows and may take appropriate actions before printing the documents. However, the present invention is used in situations in which anticipation is not possible. In that case, the output check list as described above is helpful to directly trace an entry related to a print job which has generated a recoverable error. The entry comprises an error description related to the print job. Document files of the faulty print job may be moved to a storing unit of the workstation. The operator or user may analyze the error description, take actions to prevent the same error and decide to send the print job from the storing unit of the workstation to the image-processing apparatus again.

In an embodiment of the method of the present invention, the method comprises a step of sending a notification by the image-processing apparatus to a workstation when an entry in the output check list is created. A user is notified that the output check list is updated, if a faulty print job occurred. Since faulty print jobs are rare, the user of an image-processing apparatus may feel only a need to look at the output check list if an entry of a new faulty print job is created in the output check list. To ease such a way of working, the user is only notified if an entry has been added to the output check list. The notification may be formed by a pop-up message on the user's workstation or a special mail in the user's mailbox. To assure that the user or operator will not forget to take care of the faulty print job, the notification may be configured such that the notification only disappears after the user has opened the output check list in order to check what events have caused the notification. The notification may be at once, when the change of the output check list happens. Mostly the notification is coupled to the log in of the user at the user's workstation, for example after a batch of print jobs has been printed overnight.

In an embodiment of the method of the present invention, the method comprises the step of selecting and activating the notification by the user. After activation by the user the output check list is shown at the workstation of the user. The user may analyze the output check list and take appropriate actions.

In an embodiment of the method according to the present invention, the method comprises a step of storing and marking documents of a print job which has caused a recoverable error. Storage of the documents may happen just before or after an entry has been added to the output check list. Storage may happen on a storing unit in the image-processing apparatus or on a storing unit in the workstation of the related user. If other documents are also stored than mentioned above, the documents of a print job that has caused a recoverable error may be marked to distinguish them from the other documents.

In an embodiment of the method according to the present invention, the method comprises a step of showing the output check list on the workstation. Each entry of the output check list is selectable. After opening the output check list by the user, the user may analyze an entry of the output check list and may conclude that he has to adapt a faulty document of the print job corresponding to the analyzed entry. Then the user may select and activate the entry and the at least one document of the corresponding print job, which reside in the storing unit of the workstation or the image-processing apparatus, is navigated to and shown. This is advantageous, since the user is able to immediately adapt the faulty print job in order to overcome the error reported in the entry of the output check list and send the adapted print job to the image-processing apparatus again. In the case of a multi-document print job, it may even be more efficient to send only the adapted document to the image-processing apparatus again.

According to an embodiment the output check list is remotely callable. If the user is working remotely from the image-processing apparatus on a workstation, he may indicate that he wants to see the output check list of the image-processing apparatus on this workstation. The operator looks at the output check list and determines the print job that has caused a recoverable error. If the print job contains a plurality of documents to be printed he may determine which document is missing in the output of the print job or even which pages of an incomplete document are missing. The operator may then from his desk print the missing document and/or missing pages again, e.g. in a different way. After successfully printing the missing document and/or pages, he may add the missing pages of the document to the stack of already printed documents of the printed job.

According to an embodiment the method comprises a step of showing the output check list via a user interface of the image-processing apparatus. Exactly the same procedure as described in the previous embodiment may be followed to complete incomplete documents of print jobs.

According to an embodiment the method comprises a step of selecting an entry of the output check list. After selecting an entry other actions may be performed on this entry such as editing the entry and removing the entry.

According to an embodiment the method comprises a step of removing an entry of the output check list. An error due to a print job may be recovered by an operator action which is executed after analyzing one or more entries of the output check list. These entries may then be removed from the output check list. By doing so, the output check list contains only faulty print jobs which are not yet looked after and is always a short list.

According to an embodiment the method comprises the step of automatically removing an entry of the output check list at a predetermined time after creation of the entry in the output check list.

According to an embodiment the method comprises the step of automatically removing an entry of the output check list at a predetermined time after creation of the entry in the output check list.

The invention also relates to an image-processing apparatus for printing print jobs, the image-processing apparatus comprising an output module for receiving output of print jobs, a control unit configured to maintain a queue of print jobs to be processed, and detecting means for detecting recoverable errors of print jobs characterized in that the control unit is configured to maintain an output check list comprising entries each of which is automatically created when a recoverable error occurs during processing of the print job, that does not lead to an automatic stop of the processing but is likely to cause faulted pages in the printed output, so as to advise an operator on the possibly faulted pages in the output stack.

According to an embodiment the image-processing apparatus comprises sending means for sending a notification to a workstation via a network by the image-processing apparatus, when an entry in the output check list is created.

According to an embodiment the image-processing apparatus comprises a user interface via which the output check list is shown.

According to an embodiment the image-processing apparatus storing means for storing and marking documents of the print job in case of possible faulted pages of the print job in the output stack. The marking may be executed by means of a flag in the storing means. The flag may be a memory area in the storing means comprising a number of bytes to indicate whether a document is marked or not.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 6:
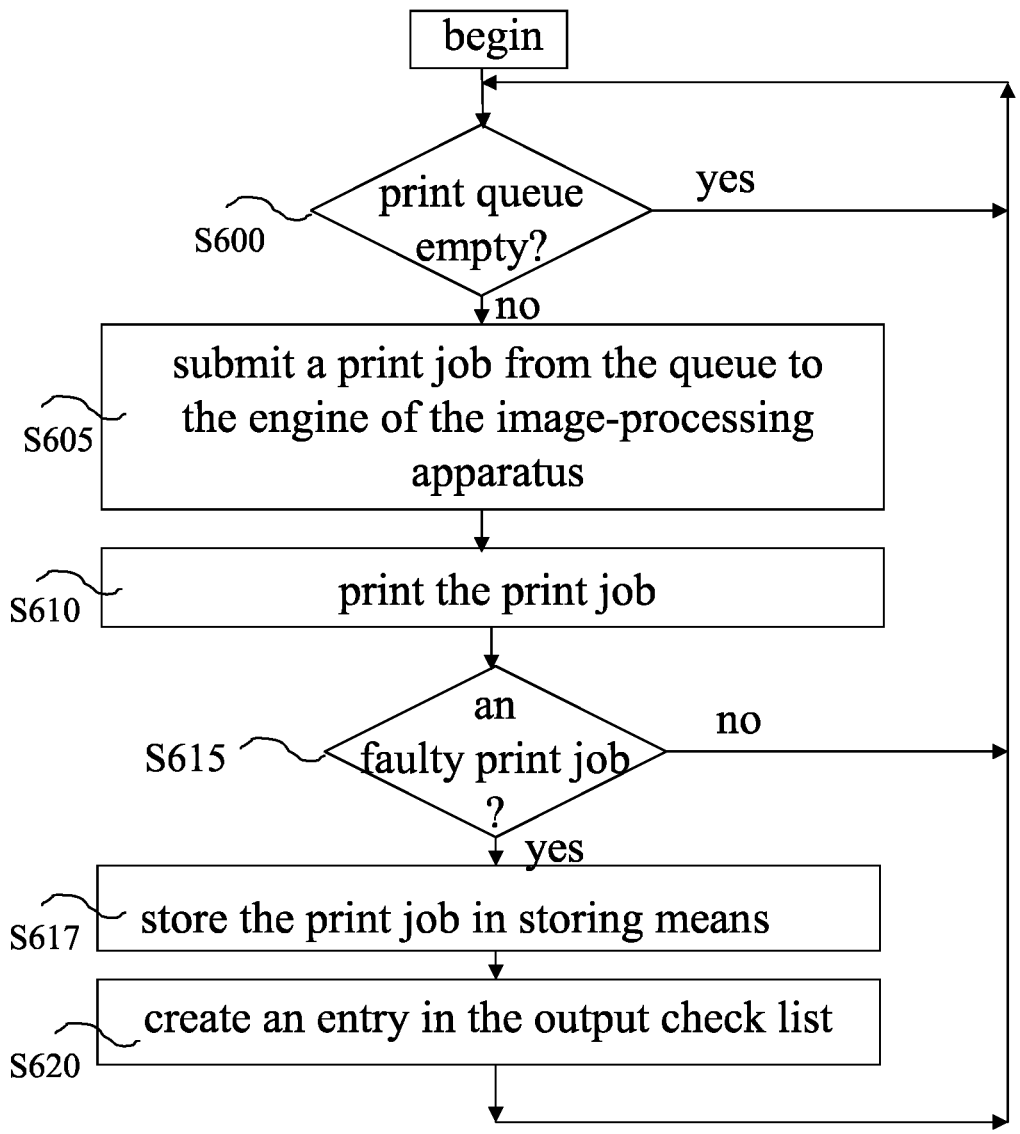
FIG. 6 illustrates a flow diagram of the method according to the invention from the perspective of the image-processing apparatus.
Figure 7:
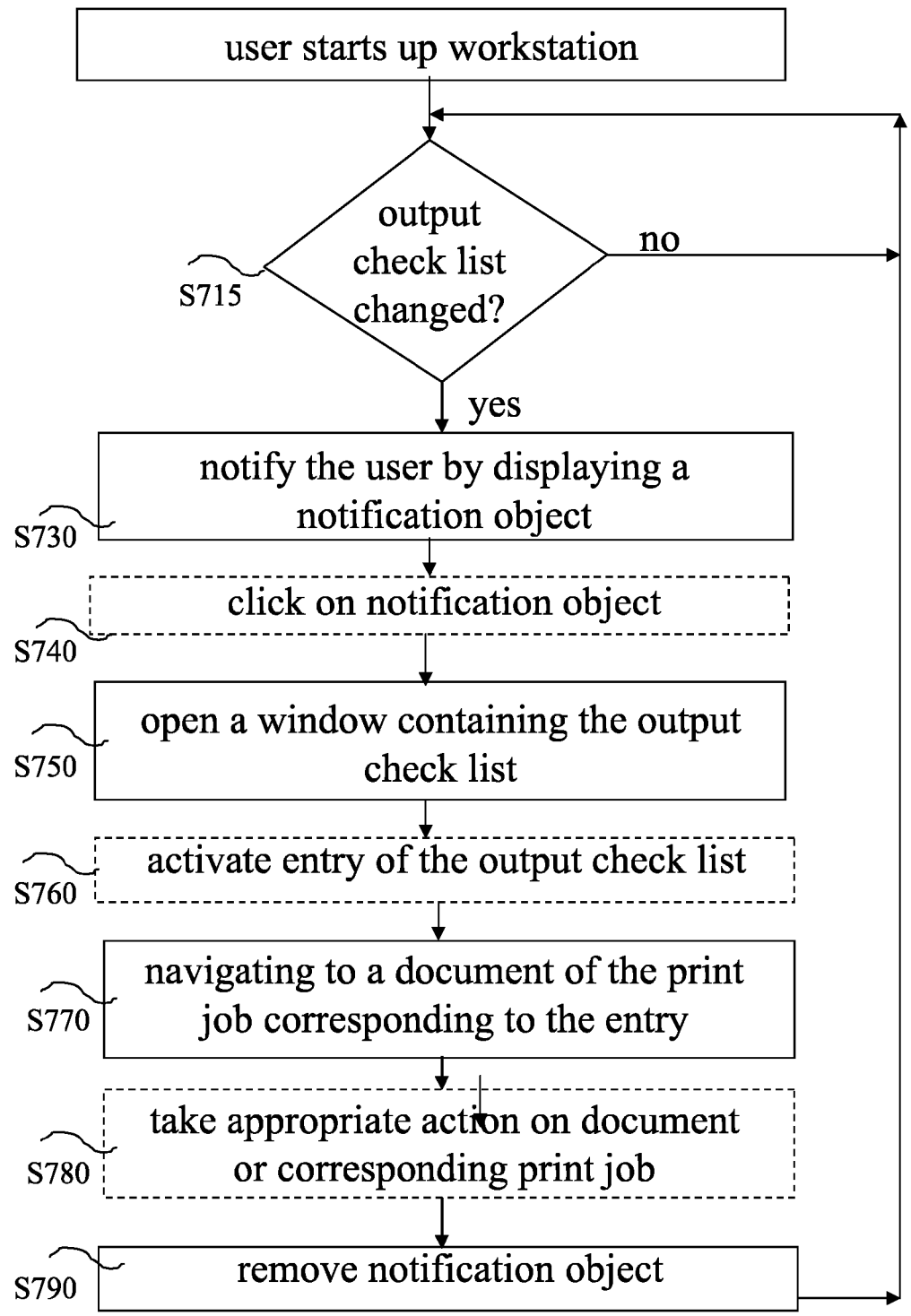
FIG. 7 is a flow diagram of the use of the output check list according to the method of the invention.

The steps of the flow diagrams of FIG. 6 and FIG. 7 describe the method according to the invention and are mentioned within the descriptions of FIG. 1-FIG. 4. The dashed steps S740, S760, S780 are carried out by a user, while the remaining steps S600, S605, S610, S615, S617, S620, S715, S730, S740, S750, S760, S770, S780, S790 are carried out by the control unit of the image-processing apparatus.

Figure 1:
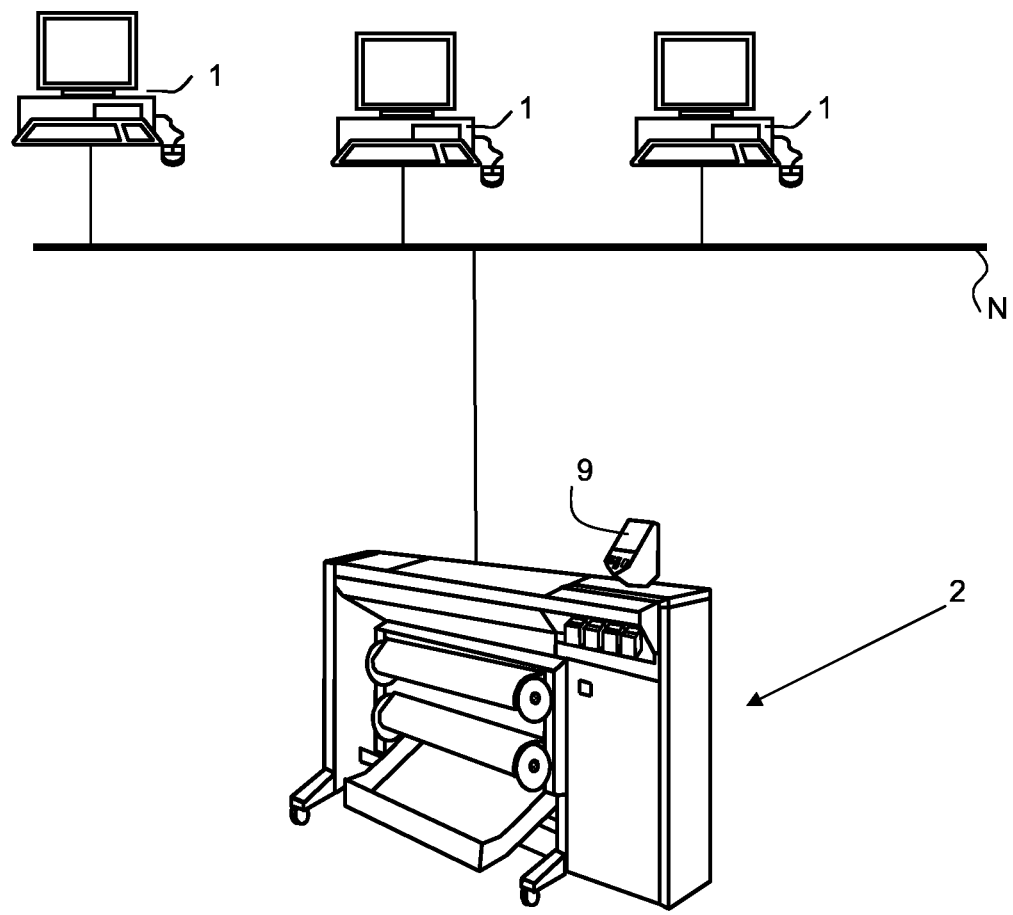
FIG. 1 illustrates a network system of workstations and an image-processing apparatus.

FIG. 1 shows a system comprising workstations 1 connected to a local network N. The method according to an embodiment of the invention is particularly suited for use in this kind of environment, where an image-processing apparatus 2 is available for a user working with one of the workstations 1 and intending to send a print job comprising a set of documents from one of the workstations 1 to the image-processing apparatus 2. The image-processing apparatus 2 is connected to the network N and is suited for receiving print jobs from the workstations 1. The network N may be wireless.

The image-processing apparatus 2 comprises a user interface 9, which will be elucidated further on.

In an embodiment, each of the workstations 1 is a personal computer provided with a processor unit, a display unit, a keyboard and a mouse or any other input device in order to let a user, who is logged in on a workstation, print one or more print jobs on the image-processing apparatus 2. The image-processing apparatus may be a printer for small and/or wide format documents.

Figure 2:
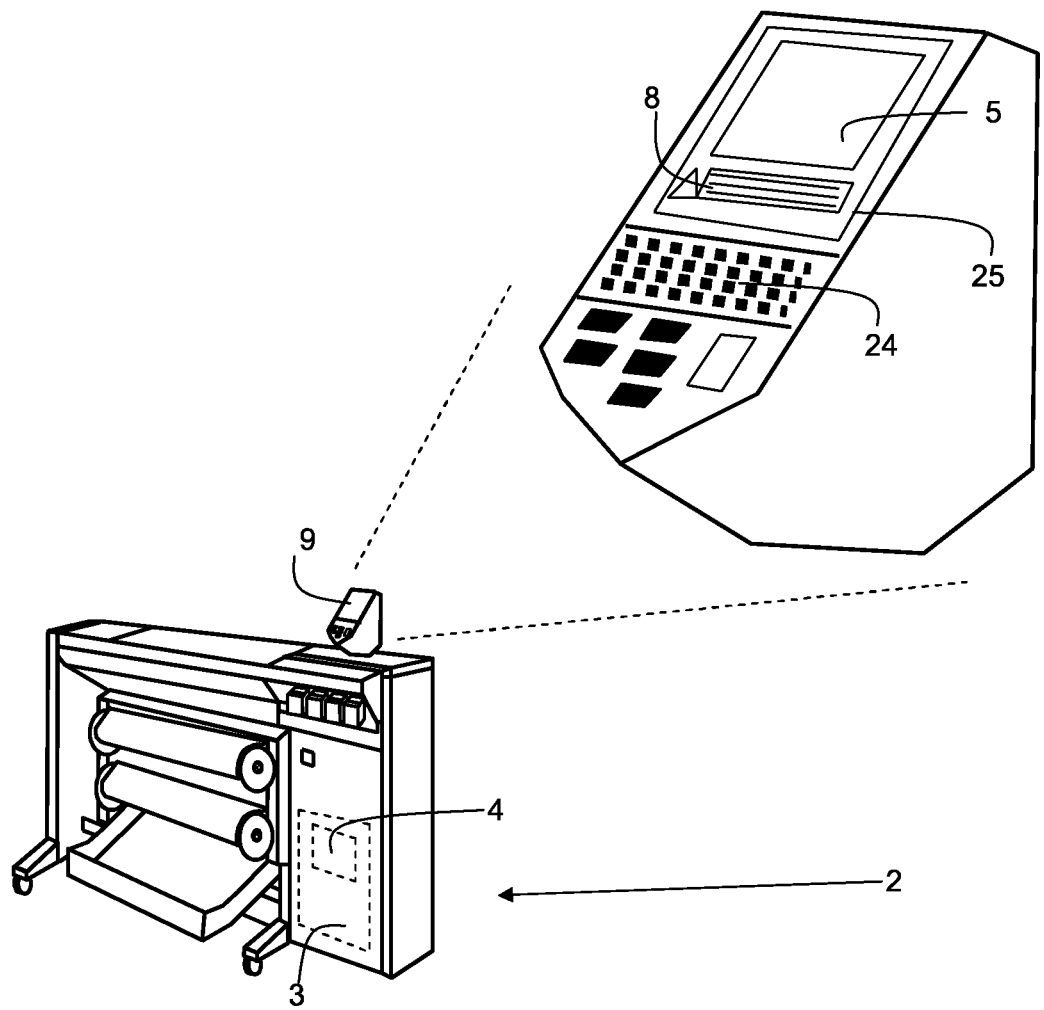
FIG. 2 illustrates a schematic functional view of an image-processing apparatus according to an embodiment of the invention.

In an embodiment, shown in FIG. 2, the image-processing apparatus 2 comprises a user interface 9 and a controller 3 comprising a control unit 3 such as a hard disk, and is further connected to a display 25 and an input device 24 such as a keyboard for enabling a user to enter commands in order to execute printing of digital documents. The display 25 and the input device 24 may be realized by a touch screen. How the image-processing apparatus may be used when performing the method according to the invention is shown in steps S600-S620 mentioned in FIG. 6.

The control unit 3 is suited to queue print jobs, to check whether or not the print queue is empty (S600) and to submit (S605) a document from a queued print job to the print engine of the image-processing apparatus 2 in order to be printed. If a print job that is printed (S610) on the image-processing apparatus 2 ends up in a faulty job (S615) due to a recoverable error, the documents of the job are stored (S617) in a storing device 4 contained in the control unit 3. An entry is added (S620) to an output check list, which may be shown on a window 5 being part of the display 25. The output check list will be described in detail hereinafter on the basis of FIG. 4.

The steps S715-S790, which may be performed by a user in order to analyze the output check list, are shown in a flow diagram of FIG. 7.

When a user starts up his workstation 1 or arrives at the image-processing apparatus 2 and identifies himself via the display 25 and/or input device 24, the control unit 3 of the image-processing apparatus 2 will check (S715) if the output check list shown on the window 5 has changed, since the last time the user has viewed this list.

In case of a change of the output check list, the control unit 3 of the image-processing apparatus 2 will send a notification (S730) to the workstation 1, respectively the user interface 9 of image-processing apparatus 2.

Figure 3:
FIG. 3 illustrates a window comprising a notification object for notifying the user of faulty jobs due to a recoverable error according to an embodiment of the invention.

Then the display 24 of the user interface 9, respectively the workstation 1 of the user, shows a notification object (S730) in case of a faulty print job. The notification object may be formed by a pop-up window 8 or a queue window on the display 25. The pop-up window 8 may contain an image, an icon, a text field or a combination of signs, indicating that the output check list has been updated. An example of a queue window 30 is shown in FIG. 3. A queue warning message 33 and a warning icon 31 show the notification. The warning icon 31 and part 32 of the queue warning message 33 may be clicked on. If the user clicks (S740) on the pop-up window 8 or, in case of a queue warning message, on the warning icon 31 or on the clickable part 32 of the queue warning message, the output check list 5 may be displayed (S750) on the workstation 1, respectively on the display 25. A user may select and activate (S760) an entry from the output check list 5 in order to adapt (S780) the corresponding job to overcome the error related to that job. When the user has activated an entry, navigating (S770) to at least one document of the corresponding print job is established. After the user has opened the output check list 5, the control unit 3 of the image-processing apparatus 2 will erase (S790) the queue warning message 33 and the warning icon 33. When the user has taken (S780) an appropriate action on the selected document or corresponding print job and goes back to the queue window 30, the warning icon 31 and the queue warning message 33 will not be visible any longer and will only then appear again when a new event due to a recoverable error has occurred.

In this embodiment, the user interface 9 of the image-processing apparatus 2 displays the output check list. The output check list may (also) be displayed remotely on one of the workstations 1 coupled to the image-processing apparatus 2 via the network N, shown in FIG. 1.

Figure 4:
FIG. 4 illustrates an output check list according to an embodiment of the invention.

In FIG. 4, a check output list 40 is shown according to an embodiment. The check output list 40 may comprise one or more entries 41, 42. Each entry may comprise a plurality of fields, which are related to an error event due to the faulty print job. A first field 43 comprises an identification of a faulty print job, for example a print job-id or a print job-name. A second field 44 comprises the number of the document contained in the faulty print job. A third field 45 comprises a user-id or username of the user who has sent the faulty print job. A fourth field 46 comprises a time-indication of the error event, e.g. date and time. A fifth field 47 comprises a description of the error event and possible instructions on how to solve an effect of an incomplete and/or an over-complete document due to a recoverable printing error. The number of the document may be the closest identification for a filename, e.g. in a multiple-file print job. The number of fields is not restricted to the fields mentioned above, but may be expanded with additional fields being necessary to support the user with the identification of the right job and the right document and with taking the right action after analysis of the fields, e.g. the error description.

Figure 5:
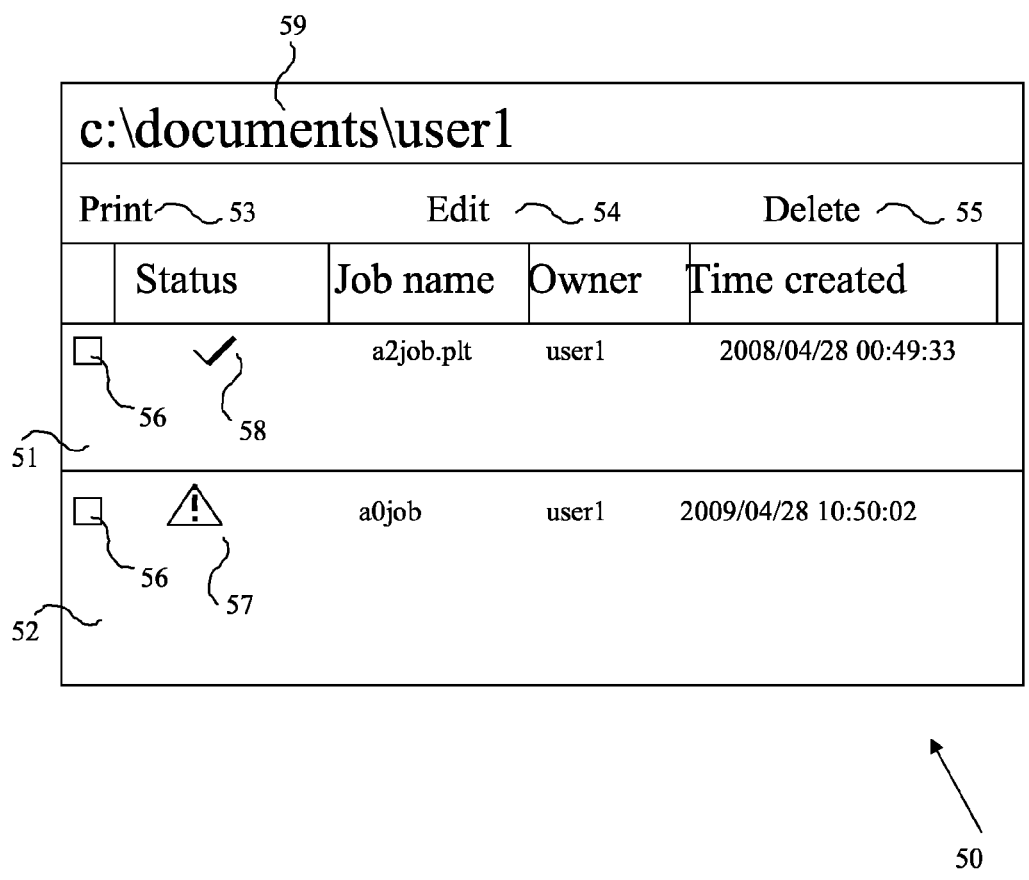
FIG. 5 illustrates a list of documents related to a faulty print job.

In an embodiment, each entry of the output check list 40 may be activated, e.g. via the display 25, for example configured as a touch screen, or by a mouse device via a mouse (double) click. When activating (S760) an entry 41 from the output check list 40, navigation is established (S770) by the control unit 3 towards at least one document that caused the error related to the selected entry 41. Such a document is stored (S617) in the storing device 4 of the control unit 3 as shown in FIG. 2 or in a storing device on the workstation of the user. For example, after activating the entry 41 of the output check list 40, a window 50 as shown in FIG. 5 may emerge, which shows a directory 59 containing a selection list. The window 50 contains the selection list of documents 51, 52, which are part of the faulty print job related to the selected entry 41 of the output check list 40 according to FIG. 4. The window 50 also contains a print button 53, an edit button 54, a delete button 55, and a selection check box 56 for each document 51, 52. The documents 51, 52 in the selection list have a status according a status icon 57, 58 in a status column. The documents that have caused a recoverable error are recognizable in the selection list by a warning icon 57. The documents that are completely printed without any error are recognizable in the selection list by a tick icon 58. A tooltip may be provided to explain briefly what went wrong, when a cursor of a mouse enters the entry of a document in the selection list.

The user may then decide to select one of the documents 51, 52 shown in the window 50 via the corresponding selection check box 56 and initiate an edit action of the selected document via the edit button 54 in order to avoid the related error when printing the document again. The edited document may be printed again via the print button 53 or deleted via the delete button 55.

The user may decide not to print the document again, for example, when analysis of the error description reveals that an extra page is printed to replace a faulty page of the printed document. A faulty page may, for example, be caused by a faulty page description in the digital input file or, by a wrong cut or an end-of-roll situation in the case of roll printing of a wide format document. In that case the user may identify the faulty job by means of the fields in the entry in the output check list, the user may check the output of the faulty job that is identified in the output check list and the user may remove the extra pages from the output of the faulty job.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for processing print jobs with an image-processing apparatus, the image processing apparatus comprising a first roll, a second roll, and an output module configured to receive an output of the print jobs and a control unit configured to maintain a queue of print jobs to be processed, said method comprising for each print job the steps of:

printing the print job with the image-processing apparatus; and stacking the output of the print job in the output module, wherein the control unit is configured to maintain an output check list and the method further comprises the steps of:

when a recoverable error occurs during processing of the print job, that does not lead to an automatic stop of the processing, but is likely to cause faulted pages in the printed output resulting from unattended printing from the first roll and thereafter from the second roll, automatically creating an entry in the output check list, so as to advise an operator on the possibility of faulted pages in the output stack, wherein a possibly faulty page in the output stack is a scrap of paper due to an end-of-roll situation of the first roll in the image-processing apparatus.

2. The method according to claim 1, said method further comprising the step of showing the output check list on a workstation.

3. The method according to claim 1, said method further comprising the step of showing the output check list via a user interface of the image-processing apparatus.

4. The method according to claim 1, said method further comprising the step of selecting an entry of the output check list.

5. The method according to claim 1, said method further comprising the step of removing an entry of the output check list.

6. The method according to claim 1, said method further comprising the step of showing of each entry of the output check list at least one of job identification items, job properties, date and time of occurrence of the error, description of the error and instructions how to solve the error.

7. The method according to claim 1, further comprising the step of automatically removing an entry of the output check list at a predetermined time after creation of the entry in the output check list.

8. The method according to claim 1, said method further comprising the step of storing and marking a document of the print job in case of possible faulted pages of the print job in the output stack.

9. The method according to claim 5, said method further comprising the step of automatically showing a document of the corresponding print job.

10. The method according to claim 1, further comprising sending a notification by pop-up message or email.

11. An image-processing apparatus for printing print jobs, said image-processing apparatus comprising:

a first roll and a second roll;

an output module configured to receive an output of print jobs;

a control unit configured to maintain a queue of print jobs to be processed; and a detecting unit configured to detect recoverable errors of print jobs, wherein the control unit is configured to maintain an output check list comprising entries, each of which is automatically created when a recoverable error occurs during processing of the print job, that does not lead to an automatic stop of the processing, but is likely to cause faulted pages in the printed output resulting from unattended printing from the first roll and thereafter from the second roll, so as to advise an operator on the possibility of faulted pages in the output module, and wherein a possibly faulty page in the output module is a scrap of paper due to an end-of-roll situation of the first roll in the image-processing apparatus.

12. The image-processing apparatus according to claim 11, further comprising a user interface via which the output check list is shown.

13. The image-processing apparatus according to claim 11, further comprising a storing unit configured to store and mark documents of the print job in case of possible faulted pages of the print job in the output stack.

14. The image-processing apparatus according to claim 11, further comprising a sending unit configured to send a notification by pop-up message or email.

* * * * *